July 27, 1965 C. J. FROSCH 3,197,411
PROCESS FOR GROWING GALLIUM PHOSPHIDE AND GALLIUM ARSENIDE CRYSTALS FROM A $GA_2$ O AND HYDROGEN VAPOR MIXTURE
Filed July 9, 1962
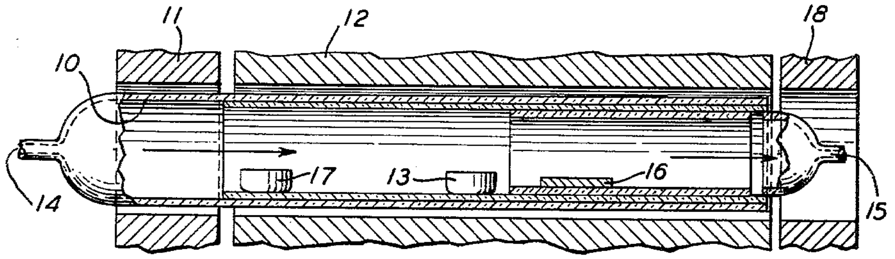
INVENTOR
C. J. FROSCH
BY [signature]
ATTORNEY 3,197,411

PROCESS FOR GROWING GALLIUM PHOSPHIDE AND GALLIUM ARSENIDE CRYSTALS FROM A $Ga_2O$ AND HYDROGEN VAPOR MIXTURE

Carl J. Frosch, Summit, N.J., assignor to Bell Telephone Laboratories, Incorporated, New York, N.Y., a corporation of New York Filed July 9, 1962, Ser. No. 208,365
3 Claims. (Cl. 252—62.3)

This invention relates to a procedure for growing single crystals of the III–V semiconducting compounds, gallium phosphide and gallium arsenide and mixtures thereof. More particularly, it concerns a vapor depositing technique for transfer of the III–V compound from a source material to a seed crystal or substrate with the formation of high-quality, uniform, single crystals. This technique is particularly well adapted to the formation of epitaxial films which are of intense interest in semiconductor device technology.

Prior art techniques for growing gallium arsenide and gallium phosphide crystals by vapor deposition techniques rely primarily upon the transfer of halogen reaction products of the source material. The transfer or carrier gas is a halogen gas and the transfer mechanism involves a halogen oxidation reaction with the source material and a reduction at the deposition surface.

The present discovery is a process for growing semiconductor crystals by vapor deposition involving the transfer of semiconductor material by virtue of a novel mechanism. The deposition obtained with this transfer mechanism has produced exceptionally high quality crystals with exceedingly fine control. The novel mechanism basically involves the vapor species $Ga_2O$ which combines readily with phosphorus or arsenic and grows epitaxially on a semiconductor substrate or seed crystal as GaP or GaAs depending upon the group V material chosen.

The $Ga_2O$ necessary for the growth mechanism according to this invention may be formed by oxidizing or reducing a gallium containing source material at temperatures in excess of 700° C. The source material may be pure elemental gallium, or may be a compound such as $Ga_2O_3$. Mixtures of these materials are also effective. Alternatively, the III–V compound itself may be used as a source material. Depending upon the source material used the $Ga_2O$ vapor species is obtained with a reducing or oxidizing reactive gas. In the case of gallium as the source material an oxidizing gas is required. Water vapor or its equivalent in terms of $O_2$ and $H_2$ or other water bearing mixtures is suitable. If GaP or $Ga_2O_3$ is selected as the source material, a reducing gas or gas mixture such as $H_2O+H_2$ is used. Various reactions for obtaining the $Ga_2O$ vapor species are:

$$Ga_2O_3+2H_2 \rightarrow Ga_2O+2H_2O$$
$$2GaP+H_2O \rightarrow Ga_2O+P_2+H_2$$
$$2GaAs+H_2O \rightarrow Ga_2O+As_2+H_2$$
$$Ga_2O_3+2CO \rightarrow Ga_2O+2CO_2$$
$$2GaP+CO_2 \rightarrow Ga_2O+P_2+CO$$
$$2GaAs+CO_2 \rightarrow Ga_2O+As_2+CO$$

Various other mechanisms, which will occur to those skilled in the art, are available to form the gallium oxide vapor species.

A vitalizing feature of this invention therefore is the growth of gallium-V crystals by the transfer of a significant quantity of $Ga_2O$ from a gallium containing source material in a semiconductor substrate in an atmosphere containing the group V element. The amount of $Ga_2O$ in the transfer gas is prescribed by saturation pressures in the temperature ranges found to be effective for growth. For this purpose a minimum saturation temperature has been found to be 700° C. At lower temperatures the transfer is excessively small and the growth rate is considered to be impractical. The pressure of $Ga_2O$ at 700° C. is 0.01 mm. Hg. This pressure is the saturation pressure at 700° C. and since saturation at the source temperature is not essential to the subsequent crystal growth, gas temperatures in excess of 700° C. may be used so long as they include at least an amount of $Ga_2O$ equivalent to 0.01 mm. Hg at 700° C. A desirable maximum vapor pressure of $Ga_2O$ for convenience in the overall operation of this invention is taken as the melting point of gallium phosphide, 1465° C. The saturation pressure of $Ga_2O$ at this temperature is approximately 1000 mm. Hg.

The carrier gas, saturated with $Ga_2O$ at a saturation temperature of at least 700° C. must also contain appropriate amounts of the group V element, phosphorus or arsenic. This component must be present in the transfer gas in amounts of 0.01 mm. Hg to 30 atmospheres. The group V element is derived from any solid source material capable of dissociating in the carrier gas to the free element at temperatures of at least 700° C. Such materials as the oxides of phosphorus and arsenic, elemental phosphorus and arsenic and metal phosphides and arsenides are suitable. In using metal salts as the source material an appropriately chosen metal ion may also serve as a doping source.

The transfer gas mixture is then passed into contact with the growth surface. This is conveniently done by using a flowing system or alternatively can be obtained in a closed system by virtue of a thermal gradient between the source and semiconductor growth surface. In either case, to obtain growth on the seed or substrate it is essential that the temperature of the growth surface be less than the saturation temperature of the transfer gas.

The phosphorus or arsenic reacts at the solid interface to form the desired Ga–V compound according to the equations:

$$Ga_2O+P_2+H_2 \rightarrow 2GaP+H_2O$$
$$Ga_2O+As_2+H_2 \rightarrow 2GaAs+H_2O$$

Care must be taken to avoid a high degree of supersaturation of the gas phase as it reaches the substrate body. When operating with excessive supersaturation the resulting crystal growth may be poor and highly polycrystalline. Accordingly, it is preferred that the temperature of saturation of the carrier gas as it reaches the substrate be not more than 200° C. higher than the temperature of the substrate itself.

The source temperature is limited by the minimum saturation temperature, at least 700° C. It is convenient to restrict the source temperature to the range 700° C. to the melting point of the Ga–V compound. The substrate temperature is necessarily cooler than the saturation temperature of the transfer gas as it reaches the substrate surface. A minimum substrate temperature of 680° C. is preferred and not less than 200° lower than the saturation temperature of the transfer gas. The maximum substration temperature is of course limited by its melting point.

The operation of this invention may be better understood with the aid of the drawing in which:

The figure is a schematic representation of an appropriate apparatus for carrying out the method of this invention.

The apparatus of the figure consists of a fused silica tube 10, 1" I.D., extending through two temperature controlled furnaces 11 and 12. The temperature profile within the quartz tube 10 reflects a minimum temperature adjacent to furnace 11 with an increasing gradient to the maximum temperature at the midpoint of hot furnace 12. At or near the hottest portion is disposed a quartz boat 13, 2" x ½" x ½", which contains the gallium bearing source material. The gas flow in this system is from inlet 14 to outlet 15 as indicated by the arrows. A substrate 16 is placed downstream from the source at a temperature lower than the source.

It will be apparent to those skilled in the art that the flow rate of the carrier gas will in part determine the degree of saturation of the gas by the source material. Thus, where the flow rate is such that saturation does not occur at the source temperature, the substrate 16 must be located far enough downstream that the gas will be at least slightly supersaturated with respect to the substrate temperature. Obviously, the flow rate is significant only in terms of a given apparatus. For the apparatus of the figure flow rates of 1 cc./min. to 10 liter/min. were found satisfactory. An additional quartz boat 17 is included in the low temperature area of the furnace to contain a group V source material and/or an impurity for doping the crystal being grown as desired. In some cases it is necessary to include two additional containers, one for the group V source material and another for the dopant, if these components are to be maintained at different temperatures. This allows for independent control over the film resistivity. The quartz tube is sectioned so as to permit removal of the substrate, source and impurity without disturbing the entire tube. A fume hood 18 is disposed at the output end which completes the basic assembly.

The following examples are included as preferred embodiments of the process of this invention.

*Example I*

Purified hydrogen gas containing 0.3 mm. Hg water vapor was admitted to the reaction tube at a rate of 100 cc./min. The quartz boat 13 contained the source material, 10 gms. of undoped GaP. The source was maintained at a temperature of 950° C. At this flow rate and temperature the carrier gas was essentially saturated with the vapor species $Ga_2O$, the actual saturation temperature being 925° C. A sulfur impurity source was contained in boat 17 in the cool end of the furnace at a temperature of 65° C. The substrate for this example was a p-type GaP wafer approximately 7 mm. in diameter by $6\times10^{-1}$ mm. thick having a resistivity of 0.2 ohm-cm. The substrate surface was polished and etched on a $(\bar{1}11)$ crystal plane. The substrate was maintained at a temperature of 870° C. After deposition for 16 hours an epitaxial film was formed on the substrate. The film was 1 mil. thick, n-type, with a resistivity of about 0.1 ohm-cm. X-ray analysis showed the film to be a high quality single crystal with $(\bar{1}11)$ crystal orientation. Diodes produced by conventional techniques from this epitaxially formed junction showed good rectifying characteristics with reverse breakdown voltages of the order of 35 volts.

This basic procedure was followed in all the following examples except for the deviations described.

*Example II*

A gallium arsenide single crystal film was grown on a gallium phosphide substrate. The source material was pure GaAs at 950° C. and the substrate was magnesium doped GaP, orientation $(\bar{1}11)$, at 900° C. The single crystal layer was 20 microns thick after a 4½ hour growth period.

*Example III*

A gallium phosphide single crystal film was grown on a gallium arsenide substrate. The carrier gas was $H_2$ containing 4.57 mm. Hg $H_2O$ and the flow rate was 100 cc./min. The source material was pure GaP at 950° C. The substrate was undoped GaAs, orientation (100) at 900° C. The single crystal layer grew 40 mils in 164 hours.

*Example IV*

A gallium arsenide film was grown on a gallium arsenide substrate by the same procedure as Example III except that the $H_2O$ content was reduced to 2.30 mm. Hg. A single crystal film was obtained having a thickness of 10 mils for a growth period of 22 hours.

*Example V*

In this example the transfer gas was $H_2$ containing 1.1 parts $CO_2$/100 parts $H_2$ at a flow rate of 270 cc./min. The procedure was otherwise the same as Example III. Large single crystal fibers were obtained on the substrate in a growth period of 20 hours.

*Example VI*

This example was conducted with a pure $H_2$ carrier gas flowing at 100 cc./min. The source material was $P_2O_5$ at a temperature of 200° C., and pure gallium at a temperature of 950° C. These source materials were in individual containers with the $P_2O_5$ being contacted at the low temperature end of the stream as shown schematically at 17 in the figure, and the gallium at the hotter position such as boat 13 in the figure. The substrate in this run was undoped GaAs (100) at 900° C. A single crystal GaP layer, 2 mils in thickness was obtained after 16 hours of growth. An advantage in using separate sources of gallium and phosphorus, as in this example, is that the relative proportions volatilized into the transfer gas can be easily controlled by varying the source temperatures independently. It will be recognized that even though the carrier gas is initially pure $H_2$, water vapor for oxidizing the elemental gallium source material to $Ga_2O$ is supplied by the reaction:

$$5H_2+P_2O_5\rightarrow5H_2O+P_2.$$

The phosphorus necessary for combining with $Ga_2O$ to form GaP is also evident.

*Example VII*

In this example the initial carrier gas was again pure $H_2$ at 100 cc./min. The source was GaP at 950° C. and ZnO upstream at 650° C. The substrate was n-type GaAs (100) at 900° C. The zinc oxide served the dual purpose of providing oxygen in the $H_2$ carrier for converting GaP to $Ga_2O$ by the reaction:

$$ZnO+H_2\rightarrow Zn+H_2O$$

$$2GaP+H_2O\rightarrow Ga_2O+2Zn+H_2O$$

and additionally provides zinc, an acceptor impurity for obtaining a p-type film. The layer was 2 mils thick after 16 hours of growth. The p-n junction formed showed good rectifying characteristics.

*Example VIII*

In this example the carrier gas was $H_2$ containing 2.3 mm. Hg $H_2O$. The source was pure GaP at 1050° C. and the substrate was undoped GaAs (100) at 940° C. A single crystal GaP film 10 mils thick was obtained after a 20 hour growth period.

*Example IX*

This example illustrates the growth of a single crystal mixture of GaAs and GaP. The same basic procedure as in the previous examples was employed while using two source boats containing 10 gms. each of GaAs and GaP, respectively. Both sources were maintained at 950° C. The carrier gas was $H_2$ having a flow rate of 100 cc./min. After 16 hours a uniform layer 1 mil thick was formed. X-ray analysis showed the layer to be a single crystal having a composition: $GaP_{0.5}$ $GaAs_{0.5}$. The mixed composition was also indicated by the transparent deep red color reflecting a shift in the energy gap of the layer to a value intermediate GaAs and GaP. By appropriate choice of the relative source temperatures of GaAs and GaP any desired mixed composition can be obtained.

*Example X*

In this example the flow rate was increased to 400 cc./min. and the source (GaP) temperature was increased to 1100° C. The substrate was GaAs (11$\bar{1}$) at 1050° C. The growth rate for this run was approximately 3 mils/hour thus illustrating the exceedingly fast growth obtainable with the process of this invention. The resulting crystal film, 30 mils thick, was exceptionally fine quality and uniformity.

The system utilizing a transfer gas of $H_2O$ in hydrogen and a source material of the Ga–V compound is particularly attractive from considerations of simplicity and reliability. As previously indicated many modifications in the transfer gas composition may be employed to give various degrees of reducing potential and growth rate. For instance, inert gases such as A, Ne, He, etc., or carriers such as $N_2$, may be used in combination with the $H_2O$–$H_2$ mixture as a diluent or to retard the growth rate. In any event the amount of $H_2O$ determined to be necessary in this particular system lies in the range $1\times10^{-4}$ atmospheres to 1 atmosphere.

Various other modifications and extensions of this invention will become apparent to those skilled in the art. All such variations and deviations which basically rely on the teachings through which this invention has advanced the art are properly considered within the spirit and scope of this invention.

What is claimed is:

1. A process for growing an epitaxial single crystal on a semiconductor substrate, said single crystal consisting of a semiconductor material selected from the group consisting of GaP, GaAs and mixtures thereof comprising the steps of passing a mixture of hydrogen containing $10^{-4}$ to 1 atmosphere of water into sequential contact with a source providing a group V element selected from the group consisting of arsenic, phosphorus and mixtures thereof, a gallium source material, the group V element and the gallium being at a temperature providing a vapor content of the group V element and $Ga_2O$ in the hydrogen water mixture at least equivalent to their respective saturation pressures at 700° C., and a substrate, the said substrate having a temperature below the lowest saturation temperature of the vapor constituents.

2. The process of claim 1 wherein the gallium source material is GaP.

3. The process of claim 1 wherein the gallium source material is GaAs.

References Cited by the Examiner

Gershenzon et al.: Article in the Journal of the Electrochemical Society, vol. 108, June 1961, pages 548–551.

Glang et al.: Article in Volume 15 of Metallurgy of Semiconductor Materials, Duterscience Publishers Publication for AIME, Conference Proceeding, Aug. 30–Sept. 1, 1961, pages 27–47.

DAVID L. RECK, *Primary Examiner.*